(12) United States Patent
Piepenbrock et al.

(10) Patent No.: US 8,571,839 B2
(45) Date of Patent: Oct. 29, 2013

(54) SYSTEM FOR SIMULATING AUTOMATED INDUSTRIAL PLANTS

(75) Inventors: Georg Piepenbrock, Ditzingen (DE); Bernhard Schenk, Nürnberg (DE); Thilo Stolper, Nürnberg (DE); Sören Zühlsdorf, Nürnberg (DE)

(73) Assignees: Siemens Aktiengesellschaft, München (DE); Siemens Product Lifecycle Management Software (DE) GmbH, Köln (DE)

( * ) Notice: Subject to any disclaimer, the term of this patent is extended or adjusted under 35 U.S.C. 154(b) by 987 days.

(21) Appl. No.: 12/386,320

(22) Filed: Apr. 16, 2009

(65) Prior Publication Data
US 2009/0265157 A1    Oct. 22, 2009

(30) Foreign Application Priority Data
Apr. 17, 2008    (EP) .................... 08007536

(51) Int. Cl.
*G06G 7/48* (2006.01)
(52) U.S. Cl.
USPC ............................................. 703/6
(58) Field of Classification Search
USPC ................................................... 703/6
See application file for complete search history.

(56) References Cited

U.S. PATENT DOCUMENTS

| | | | | |
|---|---|---|---|---|
| 5,347,446 A * | 9/1994 | Iino et al. | .......................... | 700/29 |
| 5,825,645 A * | 10/1998 | Konar et al. | ..................... | 700/28 |
| 7,263,473 B2 * | 8/2007 | Cutler | ................................ | 703/2 |
| 7,991,598 B1 * | 8/2011 | Wood | ................................ | 703/7 |
| 2006/0031626 A1 * | 2/2006 | Rapp et al. | ..................... | 711/103 |
| 2006/0100720 A1 * | 5/2006 | Martin et al. | ................... | 700/44 |
| 2006/0112382 A1 * | 5/2006 | Glass et al. | ................... | 717/168 |
| 2006/0253838 A1 * | 11/2006 | Fujii | ............................. | 717/124 |
| 2007/0198588 A1 * | 8/2007 | Moritz et al. | ............... | 707/104.1 |
| 2009/0138102 A1 * | 5/2009 | Moden | ............................ | 700/37 |

FOREIGN PATENT DOCUMENTS

EP        1795980 A1    6/2007

OTHER PUBLICATIONS

Siemens AG, "Software für die Digitale Fabrik verknüpft Produktionsplanung und Automatisierungslösung", Press Presse Prensa, Sep. 4, 2008, pp. 1-3, Siemens Pressemitteilung, XP 2496606.
"Simatic Innovations: Einblick, Überblick, Ausblick"—Neue Produkte für die Automation, Jan. 4, 2007, pp. 1-4, XP 2496607.
"Plant Simulation—Produktbeschreibung", Tecnomatix, 2005, pp. 1-75, XP 2496608.

* cited by examiner

*Primary Examiner* — Dwin M Craig

(57) ABSTRACT

Automation technology facilities are used for automating industrial processes such as the control of conveyor belts. A high-level control device with a logical model of the plant stored in the control device is disclosed. Simulation models and control programs are generated by the control device. The generated control programs have special data blocks which contain the parameters that are to be optimized by the simulation. The generated simulation models generate the parameters as result values of the simulation evaluation algorithms and supply the values in an automated manner to the special data blocks of the generated control programs.

5 Claims, 2 Drawing Sheets

Figure: Generation of the simulation model and the control programs and transfer of the optimal parameters

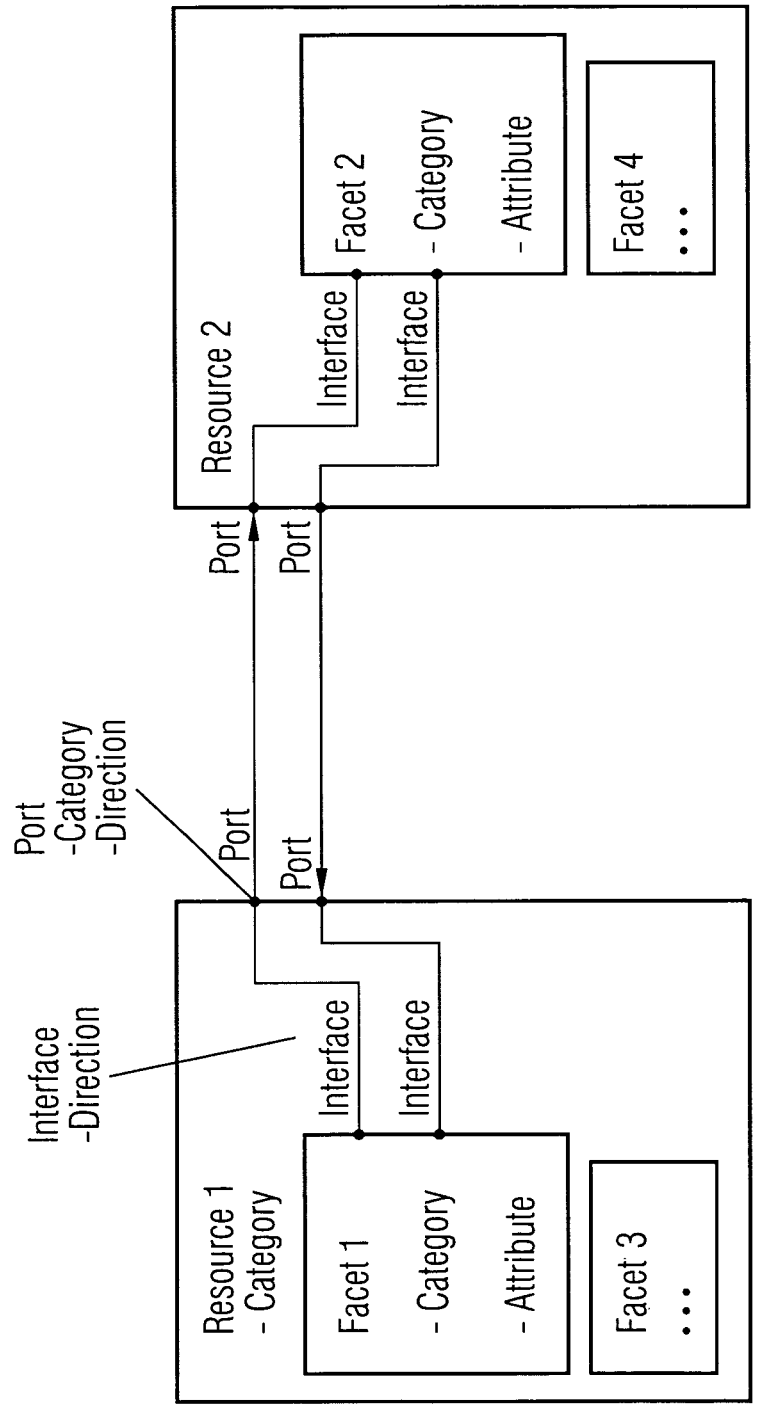

SYSTEM FOR SIMULATING AUTOMATED INDUSTRIAL PLANTS

CROSS REFERENCE TO RELATED APPLICATIONS

This application claims priority of European Patent Application No. 08007536.9 EP filed Apr. 17, 2008, which is incorporated by reference herein in its entirety.

FIELD OF INVENTION

The invention relates to a system for simulating automated industrial plants.

BACKGROUND OF INVENTION

Automation technology facilities are used for automating industrial processes such as e.g. controlling machines or conveyor belts. Thus, for example, filling bottles or packaging foodstuffs calls for an automation plant whose components must be coordinated with one another to a particular degree. The bottles/foodstuffs are supplied via a conveyor belt to the plant and there are transported by way of a plurality of stations. The process material is brought to a stop and held in what are called buffers for filling/packaging purposes and subsequently transported onward via further conveyor belts.

All components participating in the automated process are to be understood in this context as components of an automation plant. Accordingly, the sensors and actuators involved in the automation process belong to the plant components that are to be understood within this definition. In addition, however, workpieces processed by an automation plant of said type are also to be understood as plant components.

Due to the plurality and complexity of the components involved in an automation process, the software/control programs provided for controlling the components generally also have a very high degree of complexity. This gives rise to the desire to be able to test the control programs for newly developed plants or process-related modifications of existing plants before the plant is put into operation. Generally this happens in that the automated industrial plant and the real controllers are simulated with the software that is to be tested. As well as substantial cost and time savings this affords the advantage that in the case of the development of a new plant, the latter does not yet need to exist if the control software has been developed and is to be tested.

The mechatronic components of the plant are simulated with the aid of a computer and in this way useful input signals are generated corresponding to the output signals generated by the control program. Typical simulation programs normally provide behavioral models by means of which the behavior of individual plant components can be simulated. With the aid of said behavioral models it is possible, depending on predefined input values which are usually generated from the models of other components involved in the automation process, to calculate output values and to make these available in turn as input values to other components of the automation plant or, as the case may be, its behavioral models. In a graphical interface of a simulation program of said kind the individual real plant components are therefore usually represented by means of graphical symbols that have inputs and outputs which can be assigned corresponding input and output values.

In order then to simulate an automated industrial plant comprising many individual components, the user will connect the graphical objects that are assigned to the respective components to one another via the inputs and outputs in order thereby to simulate the information flow within the real plant. The more complex the automated industrial plant that is to be modeled, the more difficult and error-prone it becomes to generate a simulation model for the complete automated industrial plant.

In automated industrial plants many problems can therefore arise which lead to process material congestion. This adversely affects (reduces) the throughput of the plant. Causes to be cited include different processing times of the variants, setup times for machines and subplants in the event of a reconfiguration of the plant being necessary, and the stochastic failure of individual machines and subplants.

The approach adopted in the prior art in order to resolve said problems is to simulate the production processes that automated industrial plants will later implement, prior to the commissioning stage. This is realized by means of programs such as e.g. the Plant Simulation program. In the course of the simulation this program examines the material flow of a plant of the aforesaid kind in terms of throughput and processing times. Toward that end a logical structure (model) of the plant is mapped in the program, as a result of which different failure strategies can be enacted on the basis of different failure probabilities of the individual stations.

Furthermore, the process of the plant on the production of a certain number of variant combinations is verified with the occurrence of stochastic malfunctions. What is achieved by means of the simulation is that automated industrial plants can be produced in a robust configuration with a satisfactory parameterization of the controllers.

Also known from the prior art is a further program called Automation Designer. Said program generates the actual control programs for the PLC controller. A PLC (Programmable Logic Controller) is understood as meaning a digital computer or a control device which is used for automating industrial processes such as e.g. controlling machines or conveyor belts.

SUMMARY OF INVENTION

A problematic aspect of said prior art is that the simulation program (e.g. Plant Simulation) on the one hand and the PLC control program on the other hand create two worlds in terms of data, value type etc. between which no correlation exists. Values determined by the simulation program must be input manually into the PLC control program, which in practice can prove a time-consuming and error-prone method.

An object of the invention is to reveal a way in which the simulation of the control programs of automated industrial plants can be more efficiently structured.

The object is achieved by a system as claimed in the claims.

The advantage of the system is to be seen in the fact that the plant control is always optimally tuned to the forthcoming production. Toward that end the plant control parameters are optimized by means of the simulation process. This is accomplished during the simulation process in that a plurality of parameters is tested and an optimal value function is determined for specific parameters. By means of said value functions the parameters generated in the simulation process are then transferred automatically into the controllers via a communication link without a manual input being necessary. For that purpose corresponding data blocks are stored in the control program and the values determined as optimal are entered into said data blocks by the simulation program.

In this way the system detects potential congestion conditions in the material flow in the plant even before the start of production. In order to avoid such conditions and optimize the throughput of the plant the system optimizes the parameters of the controller in terms of the optimal size of buffers, the operating speeds of individual stations and machines, etc. Moreover, storage damage due to excessively long storage of short-lived intermediate products can be avoided by the optimization of the buffers.

In addition the plant and the individual machines and sub-plants can be operated with lower energy consumption and less wear and tear, since they run at their optimal speed.

BRIEF DESCRIPTION OF THE DRAWINGS

The invention is explained in more detail below with reference to an exemplary embodiment figuratively represented in the drawings, in which:

FIG. 2 shows the modeling of the data in Automation Designer.

DETAILED DESCRIPTION OF INVENTION

Figure 1:
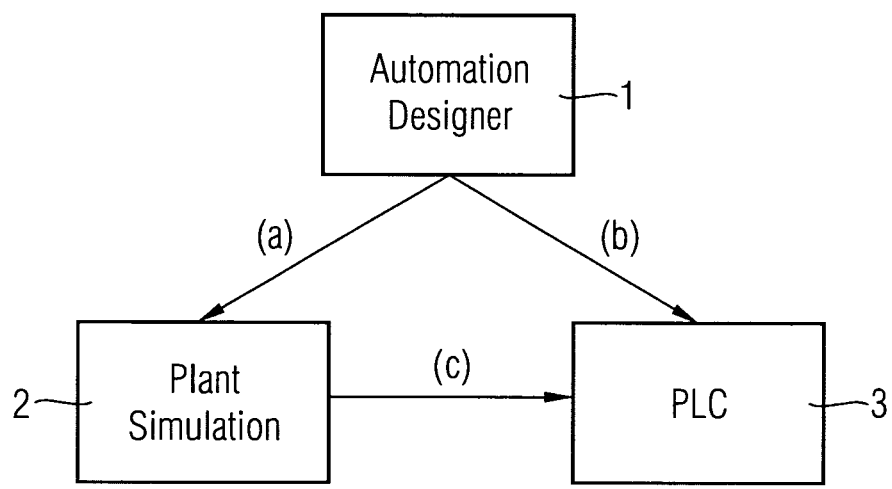
FIG. 1 shows the simulation system.

FIG. 1 shows the system consisting of a total of three components:
  a high-level control program or engineering system (1),
  the simulation system (2), and
  the control program (3).

A model of the plant is stored in the high-level control program or engineering system (1). All the elements are mapped in the model by means of resources. A resource describes an element of an automated industrial plant. In addition, a resource has a plurality of facets which thus represent a fragment of a resource.

FIG. 2 shows the modeling of the data in detail. Thus, each component of the automation plant is assigned a resource object, each of said resource objects being assigned port data. The port data assigned to a resource object is created for each port of the resource object and identifies the data which can be exchanged via the respective port. An identification of said kind goes significantly beyond the pure definition of a valid data type, for it is intended to enable an automatic assignment of mutually compatible inputs and outputs of different resource objects. The system comprises corresponding means with which the ports that are to be connected for the purpose of exchanging values can be determined on the basis of the port data. In this way the manual "wiring" of the inputs and outputs of said behavioral model presentations is no longer necessary.

In addition, each resource object contains a program fragment in which is stored the code which simulates the plant component associated with the resource object or, as the case may be, the behavior of said plant component if said code is executed by means of a suitable simulation program.

The resources therefore possess program fragments or facets which contain all the information, descriptions and simulation model and control program code fragments that are necessary for generating the simulation models 2 and the control programs 3. In this case the individual facets are linked to one another via port and interface connections in such a way that the logical connections between the individual items of information and the signal flows in the plant are mapped.

From this model the high-level control program 1 now generates the simulation models 2 in a step a and the control programs 3 in a step b. The control programs 3 have special data blocks which contain the parameters that are to be optimized by means of the simulation. Accordingly, the generated simulation models 2 likewise possess said parameters as result values of the simulation evaluation algorithms. In this case the simulation models 2 are an integral part of the simulation program (e.g. Plant Simulation).

Also stored in the simulation model 2 is a configuration of how the optimized parameters are transferred into the data blocks of the control program 3. The transfer is performed automatically in a step c.

In practice an automation engineer builds a model of an automated industrial plant in Automation Designer, which represents the high-level control program 1. For that purpose the engineer creates resources for the elements of the plant. To said resources he adds facets, each of which describes in a fragment-like manner the resource in terms of the simulation or, as the case may be, control of the plant. The signal flows in the plant and between the simulation and the controllers are then mapped by means of port and interface connections.

A simulation model 2 for Plant Simulation and the PLC control program 3 are generated from Automation Designer 1 on the basis of the facets and the mapping of the signal flows. The simulation model 2 in this case has evaluation algorithms for generating the optimal parameters for the control programs 3 and a configuration of how said parameters can be transferred to the controllers.

A day's production is simulated in the Plant Simulation program using the simulation model. For that purpose the sequence of the variants that are to be produced has already been optimized in advance. The aim now is to optimize the plant control parameters. In this case it is necessary to take into account the fact that the process material is foodstuffs. These should not remain in buffers for an unnecessarily long time between the individual process steps, since in such buffers the foods are neither refrigerated nor packaged.

The simulation program iteratively calculates the necessary sizes of the buffers using different stochastically occurring malfunctions in the plant. At the same time it also takes into account the maximum storage times of the individual intermediate products. Furthermore, the optimal operating speeds of the individual stations and machines are also determined in the process. Finally, in step c, the simulation model transfers the optimized parameters to the controllers.

If a different variant is to be deployed in the automated industrial plant—e.g. if foodstuffs are to be packaged instead of bottles filled—other parameters have to be chosen in the PLC control program and optimized by the simulation program. For that purpose it is necessary to build the corresponding model in the program Automation Designer 1 and start a simulation of the new process. This results in optimized parameters being generated which are supplied to the new PLC control program (step c).

Furthermore, the parameters for the special data blocks (3) are determined in the simulation not just by means of algorithms. They can also simply contain values which are input into the simulation program. This means that the values for the parameters are not always defined by means of automated algorithms, but can also be determined through interaction with the user of the simulation program. The user thus specifies these parameters as start values.

The invention claimed is:

1. A method for simulating an automated industrial plant, comprising:
  storing a logical model of an automated industrial plant in a control device, wherein all elements of the automated industrial plant are mapped in the logical model via resources, wherein a resource has a plurality of facets which contain information, descriptions and code fragments that are necessary for generating a simulation model and a control program, generating a control program based upon the logical model by the control device, wherein the control program includes data blocks which contain parameters that are to be optimized by a simulation, generating a simulation model based upon the logical model by the control device, wherein the simulation model includes simulation evaluation algorithms for generating optimized parameters for the control programs, optimizing the parameters using the simulation evaluation algorithms, wherein the simulation model stores the optimized parameters, transferring automatically the optimized parameters into the data blocks of the control programs.

2. The method as claimed in claim 1, wherein the facets are linked to one another via port and interface connections such that logical connections between individual items of information and signal flows in the automated industrial plant are mapped.

3. The method as claimed in claim 1, wherein the simulation models take maximum storage times of individual intermediate products into account.

4. The method as claimed in claim 1, wherein the simulation models define optimal operating speeds of individual stations and machines.

5. The method as claimed in claim 1, wherein a user of the simulation program determines the parameter values for the data blocks by specifying the parameters as start values.

* * * * *